United States Patent
Trivedi et al.

(10) Patent No.: US 6,697,439 B1
(45) Date of Patent: Feb. 24, 2004

(54) CARRIER ACQUISITION IN A DC/MA SYSTEM

(75) Inventors: Akshaya Trivedi, Richardson, TX (US); Robert Joseph McCarty, Rockwall, TX (US)

(73) Assignee: CynTrust Communications, Inc., Dallas, TX (US)

( * ) Notice: Subject to any disclaimer, the term of this patent is extended or adjusted under 35 U.S.C. 154(b) by 0 days.

(21) Appl. No.: 09/534,251

(22) Filed: Mar. 23, 2000

(51) Int. Cl.[7] .......................... H04L 27/22; H04L 27/06
(52) U.S. Cl. ...................... 375/326; 375/344
(58) Field of Search ............................. 375/326, 261, 375/344, 355; 329/304; 455/182.2, 192.2, 255, 258

(56) References Cited

U.S. PATENT DOCUMENTS

| | | | |
|---|---|---|---|
| 4,039,748 A | * 8/1977 | Caron et al. | 375/355 |
| 5,479,452 A | * 12/1995 | Hayes et al. | 375/344 |
| 5,487,186 A | * 1/1996 | Scarpa | 375/344 |
| 5,696,797 A | 12/1997 | Bucher et al. | |
| 5,805,242 A | * 9/1998 | Strolle et al. | 375/355 |
| 5,974,098 A | * 10/1999 | Tsuda | 375/340 |
| 6,151,368 A | * 11/2000 | Cochran | 375/326 |

OTHER PUBLICATIONS

Chicharo et al., "A sliding Goertzel algorithm," Signal Processing. European Journal Devoted to the Meothods and Applications of Signal Processing, Elsevier Science Pulbishers B.V. Amsterdam, NL, vol. 52, No3, Aug. 1, 1996, pp. 283–297.*

* cited by examiner

Primary Examiner—Betsy L. Deppe
(74) Attorney, Agent, or Firm—Slater & Matsil, L.L.P.

(57) ABSTRACT

Carrier wave frequency is quickly acquired without burdensome MIPs requirements by limiting the spectral analysis of the incoming channel to the expected band edges. The right and left band edges spectral energy is compared and clock frequency correction is made from the results of this comparison. A band pass filter, such as a Goertzel algorithm filter, is employed to quickly and with processing efficiency perform the spectral analysis at the band edges. Once the direction of the frequency error is derived, the correct frequency can be acquired through a feedback loop employing various iterative correction techniques, such as a gearshift approach in which certain predefined frequency corrections are imposed in decreasing steps until the desired carrier frequency has been acquired.

4 Claims, 6 Drawing Sheets

CARRIER ACQUISITION IN A DC/MA SYSTEM

CROSS REFERENCE TO RELATED APPLICATION

This application is related to commonly assigned, co-pending application Ser. No. 09/296,055 filed Apr. 21, 1999 and incorporated herein by reference.

FIELD OF THE INVENTION

This invention relates generally to methods and apparatus for acquiring the carrier frequency in a wireless communication system and specifically to a method and apparatus for examining the band edges of spectrally symmetric communications channels to iteratively derive the carrier frequency.

BACKGROUND OF THE INVENTION

The need to quickly and accurately acquire the carrier frequency of a transmitted signal is well known in the art. Wireless communications (such as two-way radios, cellular telephones, and the like) transmit by modulating an information signal onto a carrier signal or carrier frequency. In order to accurately demodulate the transmitted signal at the receiver, the carrier frequency must be accurately detected and the receiver must match its clock (oscillator) as closely as possible to the received carrier frequency.

Typical radio communication systems have base units with highly accurate and stable clocks (oscillators). The mobile units, however, generally are designed to minimize cost, weight, and power consumption and hence typically employ oscillators and clock circuits that are not as accurate or stable as those found in base units. Therefore, even if the signal is always transmitted on a known, non-varying carrier frequency, the need exists at the receiver to acquire that frequency and to bring the mobile receiver oscillator into conformity with (i.e. match to) the carrier frequency.

In some prior art systems, pilot tones have been employed to assist in carrier acquisition. These pilot tones (or pilot signals) are generally unmodulated and provide a beacon in the received signal. The receiver expects the pilot tones to be certain pre-defined frequencies and can acquire the pilot tones, using frequency and phase locked loop feedback systems to lock onto the correct pilot tone, even if the receiver's clock circuitry is initially off by some amount. The shortcoming with the use of pilot tones is that the pilot signals take up a portion of the transmission bandwidth, which is a limited and expensive resource.

Certain modulation and transmissions schemes, such as quadrature amplitude modulation (QAM) dispense entirely with the use of pilot tones. Such systems require another method for acquiring the carrier signal. Some such systems use phase locked loops to acquire the carrier signal. This method has a shortcoming in that in the event the base unit and mobile unit are significantly out of synch initially, the phase locked loop might lock onto an entirely incorrect frequency. Other prior art systems employ training symbols of a known configuration at the start of and periodically during transmission. These training symbols reduce the bandwidth available for the desired information transmission, however.

Therefore, a need exists in the art for a system for acquiring and locking onto a carrier frequency, which system does not introduce significant latency and does not require excessive computational power, which does not consume bandwidth from the desired information signal, and which is accurate across a wide range of mismatch between the transmitting and receiving units. The present invention provides such a solution, as will be described below with reference to certain preferred embodiments.

SUMMARY OF THE INVENTION

In one aspect, the present invention provides a method of deriving a carrier frequency for a communications channel of a pre-defined bandwidth and having an right and a left band edge, the carrier frequency being defined as the midpoint frequency of the pre-defined bandwidth. The method comprises deriving the right band edge spectral energy and the left band edge spectral energy at the right and left band edges of the channel, comparing the right band edge spectral energy and the left band edge spectral energy, and generating an error signal from said comparison step.

In another aspect, the invention provides a circuit for acquiring the carrier signal of a transmitted channel, the channel having an right and a left band edge. The circuit includes a first Goertzel discrete Fourier transform processor centered about the right band edge, a second Goertzel discrete Fourier transform processor centered about the left band edge, a comparator coupled to an output of said first Goertzel discrete Fourier transform processor and to an output of said second Goertzel discrete Fourier transform processor; and an error signal generator coupled to an output of said comparator. Embodiments of the invention may also include polarity detection circuit coupled to said output of said comparator and a voltage controlled oscillator coupled to an output of said error signal generator.

Features of the invention may be embodied in processes implemented on a digital signal processor (DSP), although the invention may also be embodied in integrated or discrete hardware components as well, or as a combination of DSP processes and hardware components.

BRIEF DESCRIPTION OF THE DRAWINGS

The above features of the present invention will be more clearly understood from consideration of the following descriptions in connection with the accompanying drawings in which.

DETAILED DESCRIPTION OF ILLUSTRATIVE EMBODIMENTS

The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention. For instance, in the preferred embodiments, a Goertzel's algorithm is used for illustration. A variety of band pass filters could be used instead to capture the band edge energy in order to find the band edges for calculating the frequency error in the oscillator. Other alternative approaches will be apparent to one skilled in the art when provided with the teachings provided herein.

Figure 1:
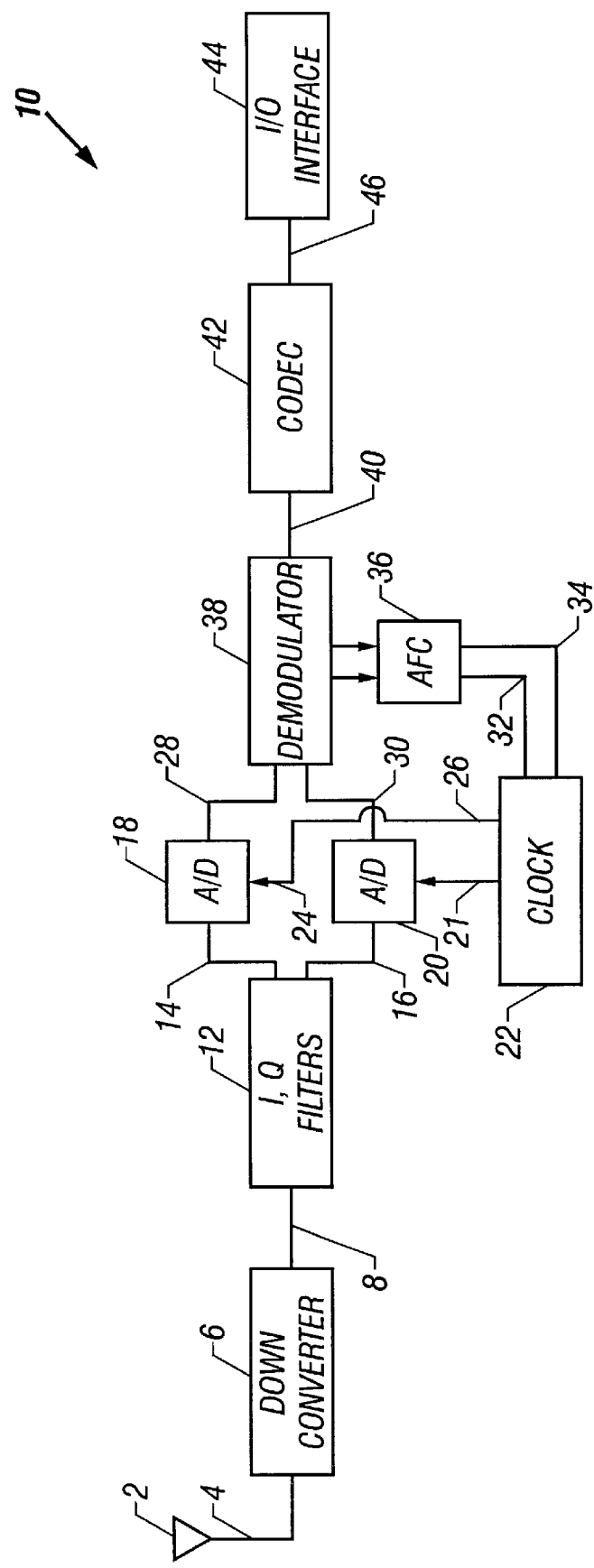
FIG. 1 is a block diagram of a mobile transceiver unit in which embodiments of the present invention may be employed.

FIG. 1 provides a block diagram of a typical mobile unit transceiver for a wireless communication system. The system may be for two-way radio, cellular telephone, satellite communication, radio or television broadcast, or the like. While wireless communications are illustrated for the preferred embodiments, the present invention applies equally to wire based communication systems such as a public switched telephone network, cable communications, and the like.

FIG. 1 illustrates the receiver portion of a mobile unit, generally designated as 10. One skilled in the art will recognize that the mobile unit 10 will also include a transmitter portion as well, which transmitter portion may share some common elements with the receiver portion.

A transmitted signal is received at antenna 2 where it is passed via signal line 4 to down converter 6. Down converter 6 brings the signal from RF to an intermediate frequency and passes the signal to I and Q filters 12 via signal line 8. The signal is broken out into its in phase and quadrature components, I and Q respectively, before being passed via signal lines 14, 16 to analog to digital converters (A/D) converters 18, 20, respectively. In the preferred embodiment, the received signal is a sixteen point constellation quadrature amplitude modulation signal. One skilled in the art will recognize that the inventive concept applies to any modulated signal, provided the signal is spectrally symmetric about some center frequency point. A/D converters 18 and 20 sample the incoming signals I and Q, respectively, at a sampling rate that is driven by clock signals on clock lines 24, 26, respectively, generated by clock 22. Clock 22 is preferably a voltage controlled oscillator outputting clock signals 24, 26 in response to error signals 32, 34 generated in automatic frequency control 36, as will be discussed in more detail below.

The digital output from A/D converters 18 and 20 is passed to demodulator 38 via signal lines 28 and 30 where the incoming signals are converted to a baseband signal before passed to coder/decoder (codec) 42. Codec 42 may include a Viterbi decoder, bit de-interleaving, and other coding/decoding circuitry as is known in the art. Finally, the decoded signal is passed to I/O interface 44 via signal line 46. In the case of voice communications, I/O interface 44 may be a speaker. In the case of data communications, I/O interface 44 may be a display device such as an LCD display.

Figure 2:
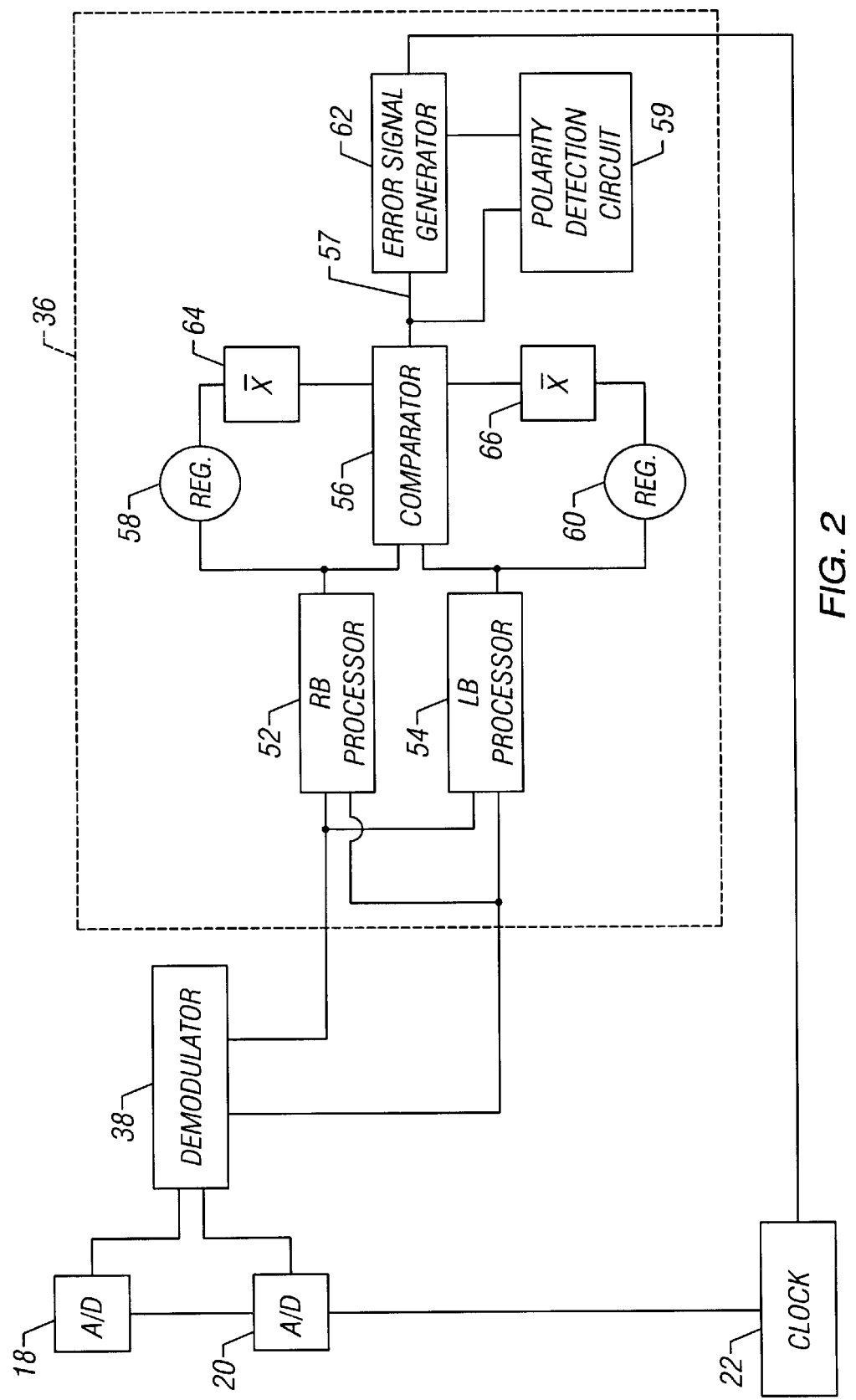
FIG. 2 is a block diagram of a preferred embodiment coarse automatic frequency control (AFC) circuit.

FIG. 2 provides further detail, in block diagram format, for AFC circuit 36. As will be more fully described herein, frequency control and carrier acquisition is accomplished by using spectral analysis about the presumed carrier frequency to adjust the mobile receiver's oscillator 22 in order to achieve spectral symmetry. After down conversion to baseband, the carrier frequency is 0 Hz. Any frequency offset will be revealed as energy asymmetry (since bandwidth is fixed) about zero. Many methods can be employed to find the spectral asymmetry. A Fast Fourier Transform (FFT) may be used to find the spectrum and then find the band edges by examining frequency bins. FFTs introduce a sharp processing spike, however, for the receiver's processor of digital signal processor (DSP). This spike, often referred to as peak MIPS, adds to the cost and complexity of the receiver requirements. Other alternatives, such as discussed below, may limit the MIPs requirement. The methods and apparatus described herein can be employed for coarse carrier acquisition at initiation of communications between a transmitter and receiver, and can also be employed for fine frequency adjustment and control during communication. As shown, AFC circuit 36 receives the digital samples from A/D converters 18 and 20 by way of demodulator 38. The digital samples are input to the inputs of right band edge processor and left band edge processor 54 wherein the spectral energy for the right and left band edges, respectively is determined. The spectral energy values output from right band edge processor 52 and left band edge processor 54 are fed to comparator 56 where the energy spectral values are compared. The outputs from right band edge processor 52 and left band edge processor 54 are also fed to registers 58 and 60, respectively, where the values are stored for future processing. The outputs from registers 58 and 60 are fed to average calculators 64 and 66, respectively, where the average values for the spectral energy values stored in registers 58 and 60, respectively, are calculated. These average right band edge and left band edge spectral energy values are passed to comparator 56.

Comparator 56, acting upon right and left band edge values from processors 52 and 54, respectively, or acting on average right and left band edge values from average calculators 64 and 66, respectively, will generate a comparison signal based upon a comparison of the inputs. In the preferred embodiment, the comparison signal 57 is a logical high if the right band edge energy value is higher than the left band edge energy value. If the right band edge energy value is lower than the left band edge energy value, comparator 56 generates a logical low for the comparison signal. Comparison signal 57 is passed to error signal generator 62 where an error signal, such as a frequency error correction signal, is calculated and passed to clock 22, as will be described in further detail below. In other embodiments, the output of comparator 56 outputs an error signal having a polarity, which polarity is detected by optional polarity detector 59.

Figure 3A:
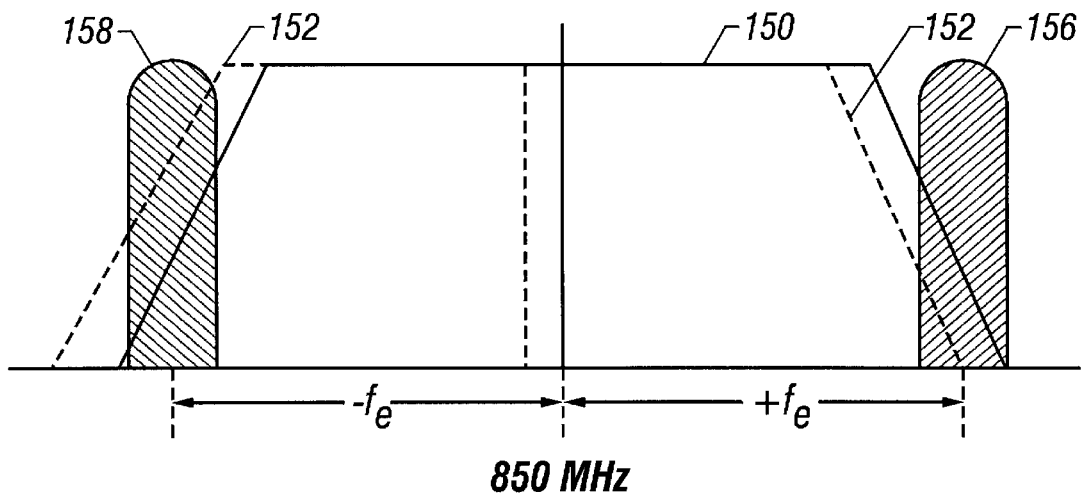
FIG. 3a illustrates a spectral waveform for a typical received signal channel.

The operation of AFC circuit 36 will become more clear with reference to FIG. 3a and the following description. FIG. 3a provides a spectral waveform for an idealized signal channel 150. For illustration purposes, the waveform illustrates a 25 kHz channel that was transmitted centered about a carrier frequency of 850 MHz. One skilled in the art will recognize that the specific channel bandwidth and center frequency is solely for illustration. The inventive concepts taught herein apply regardless of the channel width or carrier frequency chosen for implementation. Ideally, the mobile unit's clock 22 would exactly match the 850 MHz frequency and would duplicate the transmitted signal upon sampling and demodulation. In actuality, however, the mobile unit's clock 22 will likely be shifted off from 850 MHz by some amount. Note that while the transmitted signal is centered about some radio frequency (e.g., 850 MHz), the signal is down-converted to base band, so the center frequency for processing is nominally 0 Hz.

The dotted line representing a non-ideal waveform 152 illustrates the result of a frequency error in the receiver's clock 22. The error will cause the receiver to impart a spectral shift into the signal that is sampled and demodulated. This spectral shift can introduce significant error into the demodulated signal and result in an unacceptable bit error rate (BER).

In the preferred embodiments frequency errors are detected by spectrally analyzing the band edges as illustrated by curves 156 for the right band edge and 158 for the left band edge. Note that the spectral energy under curves 156 and 158 will be equal in the ideal case where the carrier signal is matched—illustrated by channel 150. Channel 152, however, exhibits frequency shift to the left, and as a result, there is greater spectral energy for channel 152 at the left band edge 158, than at the right band edge 156.

In a preferred embodiment, the spectral energy analysis is derived by use of the Goertzel algorithm, which provides for a fast way to compute discrete Fourier transform (DFT) by taking advantage of two facts:

1. The periodicity of phase factors $\{W_{kN}\}$ allows the expression of the computation of the DFT as a linear filter operation utilizing recursive difference equations; and
2. Only a few of the spectral values of an actual DFT are needed. The spectral components of interest are the band edges of the base signal.

Preferably, the spectral analysis is accomplished by passing the modulated signal through a first Goertzel's algorithm filter to derive the right band edge spectral energy and through a second Goertzel's algorithm filter to derive the left band edge spectral energy.

Figure 3B:
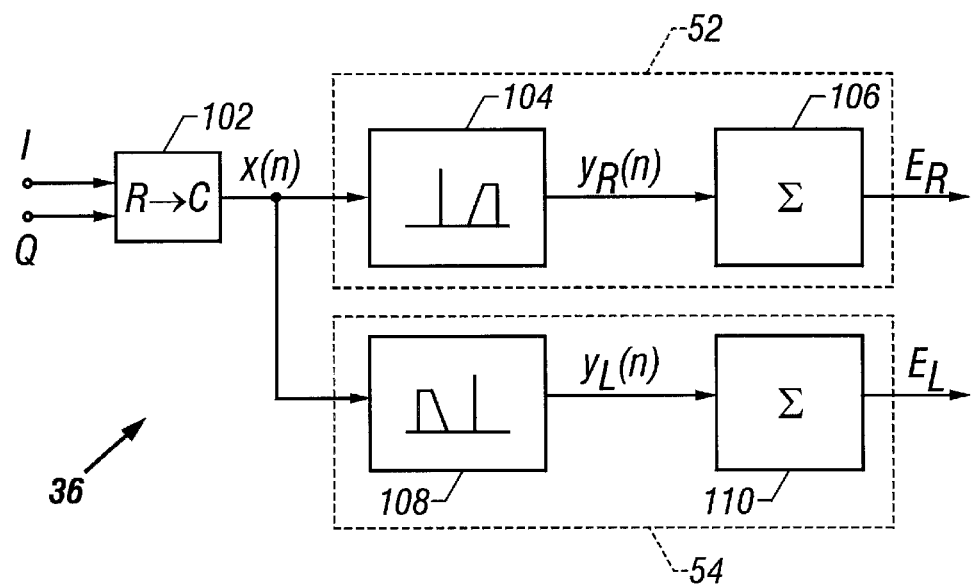
FIGS. 3b through 3d provide block diagrams of a preferred embodiment band pass filter.

FIG. 3b provides additional details of the right band edge and left band edge processors 52 and 54, respectively of automatic frequency control block 36. As illustrated, the real components of the complex signal, I and Q are input to AFC block 36 and are passed to a real to complex filter 102, resulting in complex signal x(n). Recognizing that the I and Q signals are actually a sample stream, i(n) and q(n), respectively, complex signal x(n) can be described mathematically as i(n)+jq(n). This complex signal is then passed to the input of right band edge band pass processor 52 and also to the input of left band edge band pass processor 54. Band pass processors 52 and 54 and designed to be centered about the upper and lower, or right and left, edges of the frequency band of the desired signal. In the case of an exemplary 25 kHz modulated signal, centered about a nominal base band carrier frequency of 0 Hz, right band pass filter is centered about 9200 and left band pass filter is centered about −9200.

Figure 3C:
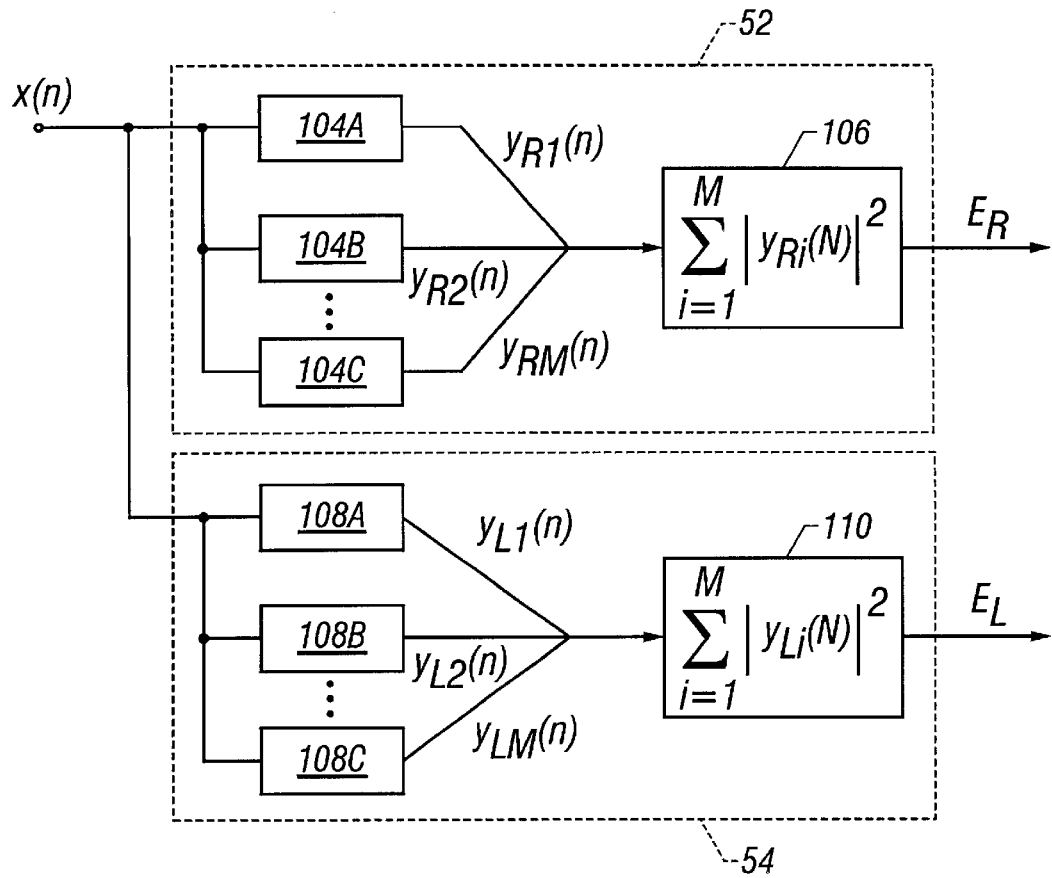

Right band edge filter 52 includes band pass filter 104 and integrator 106. In some embodiments, band pass filter 104 may comprise a single band pass filter, in which case the output from the filter $y_R(n)$ is simply passed through integrator 106, where the magnitude of the (complex) signal is squared to derive the energy component. From integrator 106 the energy component value is output from right band edge processor 52, where the signal is passed to comparator 56, as described above. Likewise, left band edge processor 54 includes band pass filter 108 and integrator 110, and outputs a value corresponding to the energy component of the portion of the frequency spectrum passed by band pass filter 108. In other embodiments, right edge band pass filter 104 and left edge band pass filter 108 are realized as a bank of multiple band pass filters. FIG. 3c illustrates such an embodiment.

As shown in FIG. 3c, right edge band pass filter 104 can be realized as a series of filters 104a, 104b, 104c, etc., each being centered about a different portion of the right band edge. In the preferred embodiment, each filter 104a, 104b, 104c, etc. has a band width of approximately 80 Hz and such filters are employed to determine the overall energy contained within the band edge. The output from each of these filters 104a, 104b, 104c corresponds to the amount of energy associated with that portion of the frequency spectrum for which that particular filter passes. Each of these outputs is then passed to integrator 106. Recall that the input signals x(n) and hence the output signals $y_{104a}(n)$, $y_{104b}(n)$, $y_{104c}(n)$, etc. for the filters are complex signals. Therefore, in order to derive energy value, the magnitude of each output signal is squared and the results are added together in integrator 106. The resulting output from right edge band pass processor 52, $E_R$, corresponds to the amount of energy contained within the signal at the upper or right band edge.

Likewise, the energy contained within the spectrum associated with the lower or left band edge is detected in processor 54 using left edge band pass filter 108. Also shown in FIG. 3c, this filter can also be realized as a bank of filters 108a, 108b, 108c, each of which passes a portion of the frequency spectrum associated with the defined lower band edge. The complex outputs of these filters 108a, 108b, 108c are then passed to integrator 110, where the magnitudes of the signals are squared and summed together.

Figure 3D:
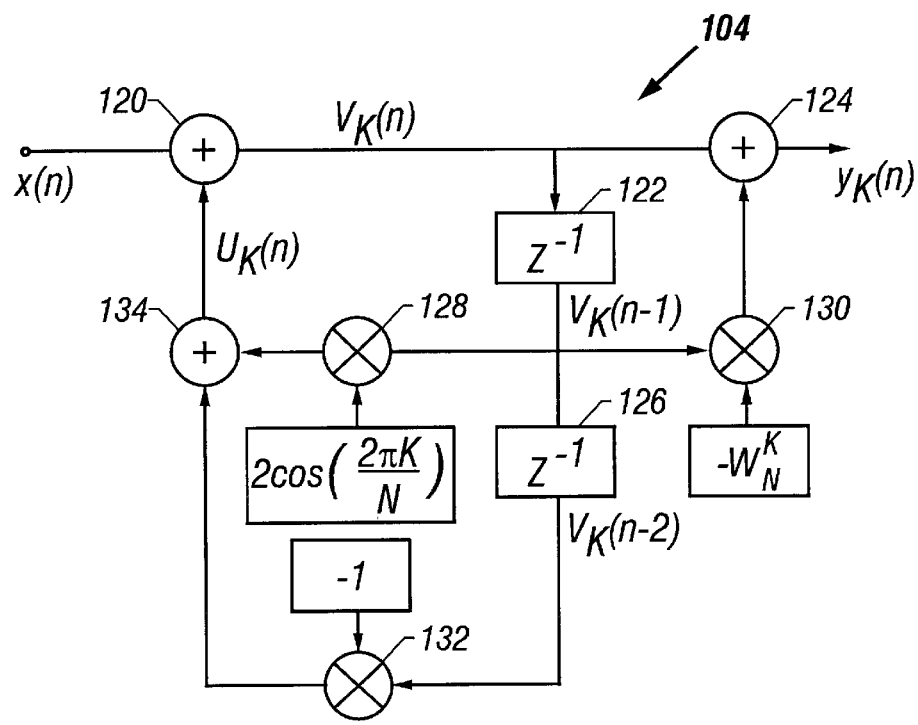

A preferred embodiment band pass filter (e.g., 104a, 104b, 104c, 108a, 108b, 108c, etc.) is illustrated in FIG. 3d. Each sample x(n) of the complex input signal is input to the filter and passed to adder 120 where it is combined with complex signal $U_k(n)$. Signal $U_k(n)$ is an internally generated signal that will be described in more detail below. Intermediary signal $V_k(n)$ is output from adder 120 and passed to delay element 122 and adder 124. Delay element 122 imposes a one cycle delay to the signal, outputting delayed signal $V_k(n-1)$. This delayed signal is passed to a second delay element 126, as well as to mixers 128 and 130. Second delay element 126 imposes an additional delay cycle on the signal and the delayed signal $V_k(n-2)$ is passed to mixer 132, where the signal is inverted. This is accomplished by mixing the signal with an internally generated signal of negative one.

The output from first delay element 122 is also combined, in mixer 128, with a first internally generated signal $$2\cos\left(\frac{2 \cdot \pi \cdot k}{N}\right),$$

where k is the filter coefficient associated with a specific filter (104a, or 104b, or 108a, or 108, etc.) and N is the total number of samples to be analyzed in order to determine the energy contained within the band of spectrum being passed by the filter. The output from mixer 128 is added to the output from mixer 132 in adder 134, resulting in the signal $U_k(n)$, which is added to incoming signal x(n), as described above.

The output from first delay element 122 is also mixed in mixer 130 with an internally generated signal, $-W^k_N$, where $$W_N = e^{-j\frac{2\pi}{N}}.$$

The output from mixer 130 is added to intermediary signal $V_k(n)$ in adder 124, resulting in output signal $y_k(n)$. As will be apparent to one skilled in the art, exemplary filter 104 is a recursive filter from which the energy contained within the passed portion of the frequency spectrum can be obtained by passing N samples through the filter. The preferred embodiment filter provides the advantage that filter processing can begin immediately upon receipt of the first sample, rather than waiting for the entire sample set to be loaded and stored. Additionally, the preferred embodiment is efficient and is not computationally complex or time consuming. In the preferred embodiments, sufficient accuracy and speed has been obtained using a sample set (N) of 512 samples which samples are processed at a 52 kHz sampling rate. One skilled in the art will recognize that the band pass filters can be embodied in various ways including, e.g., as resonating filters, as are well-known in the art.

The width of the band edge analyzed is dependent upon the desired bandwidth resolution that enables good noise suppression and signal-to-noise enhancement. In the preferred embodiments, for a 18.4 kHz wide signal, the energy contained within a 0.4 kHz wide upper and lower band edge is detected in filters 52 and 54, respectively, and then compared in comparator 56.

Each filter 104a, 104b, 104c, etc. has a pass band width of about 80 Hz. In the preferred embodiments, the right and left band edges of interest are 400 Hz wide. Five filters are hence required to analyze the energy contained within the right band edge and an equal number are required for analyzing the left band edge. Of course, the number and band width of the band pass filters is a matter of design choice and one skilled in the art will readily recognize multiple variations can be obtained through routine experimentation. Preferably, the number of band pass filters is set by a combination of the overall transition bandwidth of the spectrum, the sampling rate, and the length of time necessary to get a non-fluctuating estimate of the band energy.

As shown in FIG. 3c, the outputs y(n) from each of band pass filters 104a, 104b, 104c, etc. are passed to integrator 106, where the squares of the signals' magnitudes are summed together to generate signal $E_R$ corresponding to the energy contained within the right band edge. Likewise, the outputs from each of the band pass filters 108a, 108b, 108c, etc. are passed to integrator 110 where the squares of the signals' magnitudes are summed together to generate signal $E_L$ corresponding to the energy contained within the right band edge. These signals are passed to comparator 56 for comparison, as discussed in detail above. Once the spectral energy at the band edges has been derived, the right and left band edges can be compared. If the left band edge has a greater spectral energy, this indicates a shift to the left and the clock frequency can be increased to compensate. Likewise, if the right band edge has a greater spectral energy, indicating a shift to the right from the actual carrier frequency, then the clock can be decreased to compensate. As will be apparent to one skilled in the art, the spectral energy at the band edges is preferably not a value that is determined instantaneously. Rather, the values are derived from a time average of the spectral energy at the right and left edges of the modulated signal. The duration for calculating the time average will depend upon the processing requirements of the system, the stability of the received signal, and the response constraints of the particular receiver.

Having determined the direction of frequency shift, and hence the direction of frequency correction, one still needs to estimate the amount of spectral shift (and hence the amount of frequency correction). One preferred embodiment is to employ a "gearshift" where three possible frequency shifts are defined a priori. In a first preferred embodiment, these three frequency shifts are selected as 30, 60, and 100 Hz.

Figure 4A:
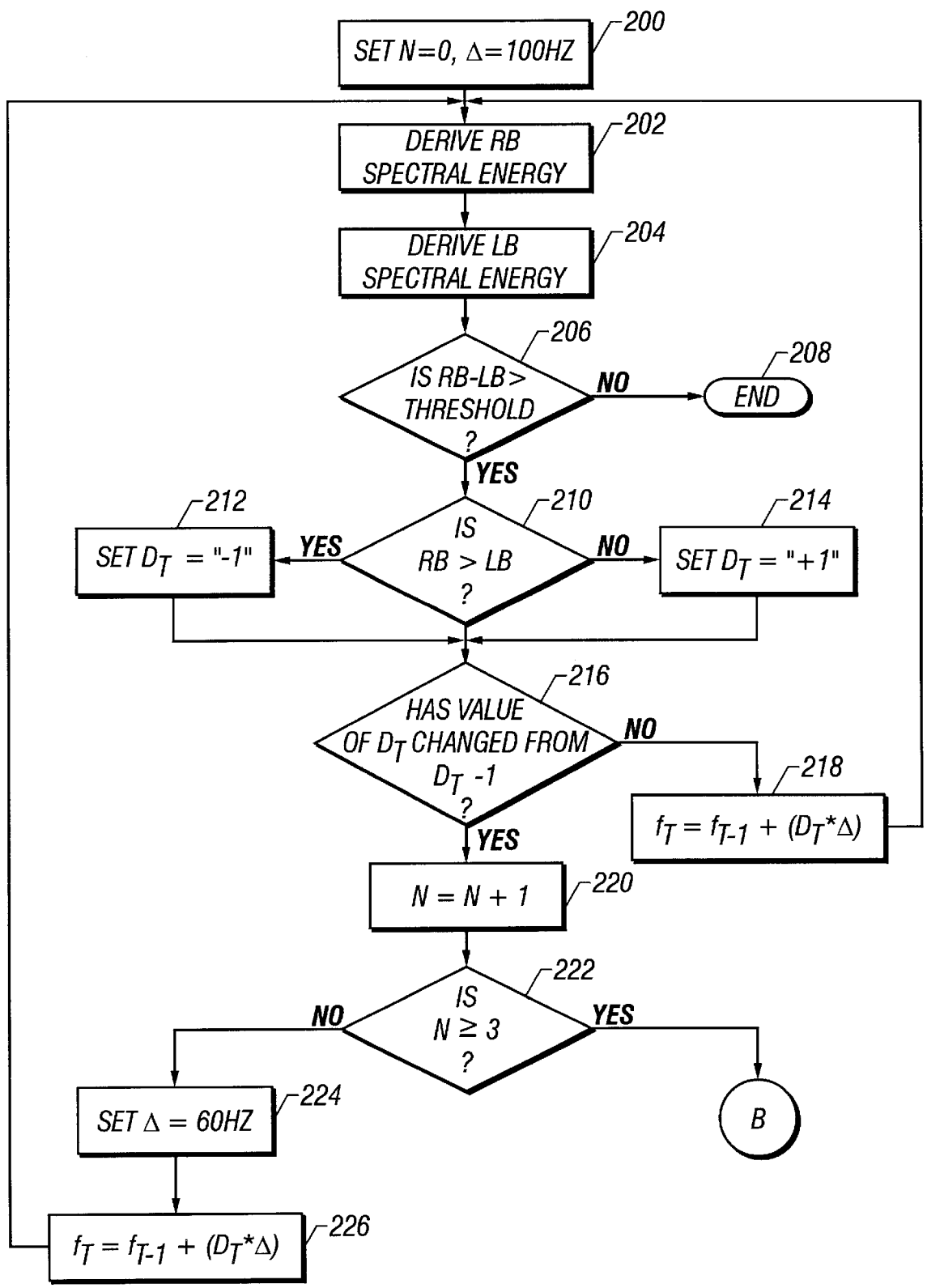
FIGS. 4a and 4b provide flow charts for a preferred embodiment carrier signal acquisition method.

FIG. 4a provides a flow chart illustration of the preferred embodiment gearshift iterative approach to adjusting the clock frequency in response to the error signal generated from the spectral analysis of the band edges. Beginning at step 200, the process begins with variables N and Δ being set to their initial values. N is simply a counter, as will be discussed below. Δ is the value for the amount of frequency shift to be applied. As discussed above, Δ can be of the value of 100, 60, or 30 Hz. For the first iteration, Δ is set to 100 Hz.

In steps 202 and 204, the spectral energy for the right band edge (RB) and the left band edge (LB), respectively, is determined for the incoming signal frame, as is discussed above in detail with respect to FIGS. 2 and 3. The values for the right and left band edges are compared in step 206 to determine whether the difference between them exceeds some pre-set threshold. With reference to FIG. 3 and the description thereof, it should be apparent that if the right band spectral energy RB is very close in value to the left band spectral energy LB, then the signal was sampled and demodulated at or very close to the actual carrier signal frequency and no further processing is required, as indicated by step 208.

On the other hand, as is typically the case, if the RB and LB spectral energies have a value difference above the threshold, processing proceeds to step 210 where the direction of the frequency shift is determined. As discussed above, if RB is greater than LB, this indicates that the mobile unit's clock is too fast, resulting in a spectrum shift to the right. Under those circumstances, the clock frequency must be retarded or decreased, and processing proceeds to step 212 where variable $D_T$ is set to "−1." On the other hand, if LB is greater than RB, indicating that the signal has been shifted to the left as a result of the mobile unit clock operating at a frequency above the carrier frequency, then processing proceeds to step 214 where $D_T$ is set to "+1." In some embodiments, because comparator 56 outputs only a single signal, polarity detector 59 is employed to determine the polarity of the output signal to determine whether LB is greater than or less than RB. As will become apparent from the following description, $D_T$ is simply a direction indicator, being positive in value when it is desired to increase or increment the clock frequency and being negative in value when it is desired to decrease or decrement the clock frequency.

Once the value for $D_T$ has been set, either positive or negative, processing proceeds to step 216 where the value for $D_T$ is compared to the previously determined value for $D_T$. If $D_T$ has changed value (i.e. gone from negative to positive or positive to negative) this indicates that the direction of the frequency correction has changed since the last frame, indicating an overshoot of the desired carrier frequency. Under those circumstances, processing proceeds to step 216 as will be discussed below. If the value of $D_T$ has not changed from the prior value, this indicates that the direction of frequency correction has not changed and processing proceeds to step 218.

In step 218, the clock frequency $f_T$ is shifted from the previous frequency ($f_{T-1}$) by an amount equal to the value Δ. Note that if $D_T$ was set negative in step 212, then the clock frequency will be decreased and if $D_T$ was set positive in step 214, the clock frequency will be increased. In the illustrated embodiment, Δ is initially set to 100 Hz, and hence $D_T$ will be increased or decreased by 100 Hz in step 218. Processing then returns to steps 202, 204 where the right band spectral energy RB and left band spectral energy LB is derived for the next frame of the incoming signal, and the above described process is repeated.

Returning to a discussion of step 216, the following applies for the case where it is determined in step 216 that the value of $D_T$ has changed. Recall that this indicates that the AFC has overshot the actual carrier frequency and the clock frequency must now be modified in the reverse direction to lock onto the desired frequency.

Processing continues with step 220, where counter N is incremented by 1 and thence to step 222 where the value of N is compared to a pre-set threshold value. In the preferred embodiment, the pre-set threshold value is set at 3, as illustrated. Counter N is used to identify a situation where the AFC error signal is causing the clock frequency wobble back and forth on either side of the carrier frequency, resulting in the direction of the correction ($D_T$) changing back and forth. If the value of $D_T$ has changed (from positive to negative, or vice versa) three times or more, then processing will continue as described with reference to FIG. 4b, below. On the other hand, if N is less than 3, indicating that $D_T$ has changed sign less than three times, this indicates that further iterations toward the carrier frequency are in order. However, because $D_T$ has changed directions at least once (as determined in step 216), a smaller iterative step should be used. In step 224, the value for Δ is set to 60 Hz resulting in a smaller correction to the clock frequency in step 226. Note that, as with step 218, the clock frequency $f_T$ will be either increased or decreased, depending on the sign of $D_T$. After the clock frequency has been changed in step 218, processing returns to steps 202, 204 where the right band spectral energy RB and left band spectral energy is derived for the next frame of the incoming signal, and the above described process is repeated.

Figure 4B:
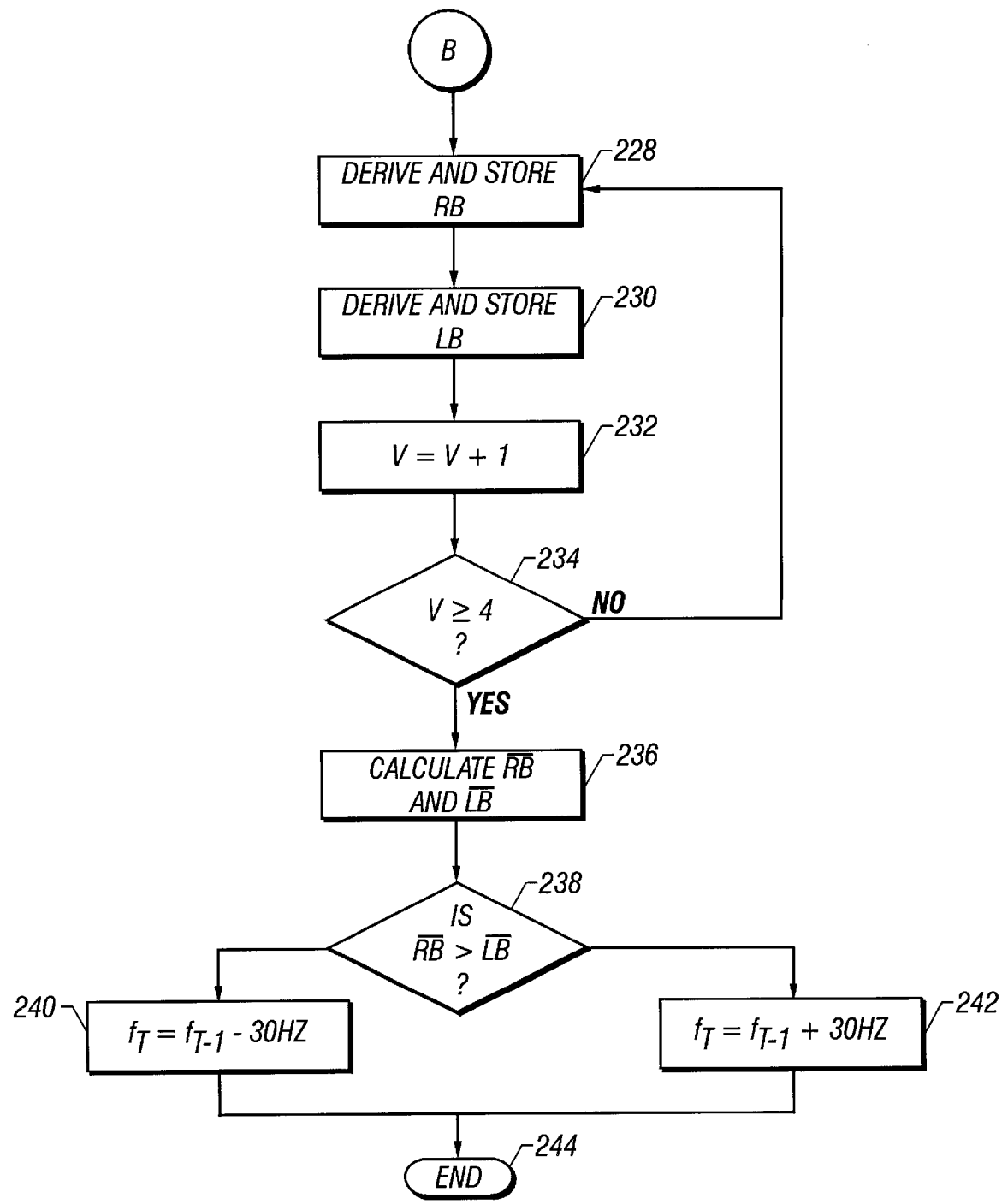

FIG. 4b illustrates the process steps that take place once it is determined (in step 222 of FIG. 4a) that the error signal is flip-flopping or wobbling about the desired carrier frequency. Under these circumstances, the AFC will hold off on sending further error signals for a pre-set number of frames, such as four frames, as illustrated, before sending a final correction to the clock. As shown in FIG. 4b, processing begins at step 228 where the right band edge spectral energy RB is derived, similarly to step 202 of FIG. 4a, and stored. Four consecutive frames of RB and LB data are derived and stored, as indicated by steps 232 and 234. Likewise, the left band spectral energy LB is derived and stored in step 232. Once four frames have been derived and stored, processing continues to step 236 where the average for the four RB values and the average for the four LB values are determined. The average values for RB and LB are compared in step 238. If the average value for RB is greater than the average value for LB, then the clock frequency needs to be increased slightly, and processing continues to step 242 where the clock frequency is increased by 30 Hz. Otherwise, if the average value for RB is less than average value for LB, then processing proceeds to step 240, where the clock frequency is lowered by 30 Hz.

Note that the above embodiments describe a method and apparatus for acquiring a carrier frequency by a mobile receiver. In other embodiments, the same method and apparatus can be employed in a base unit receiving signals transmitted by one or more mobile units. In the case of a DC/MA™ architecture, such as a Digital Channel/Multicarrier Architecture, wherein an FCC frequency channel is divided into several sub-channels, the mobile unit transmits only over a sub-channel. In that case, the base unit would need to lock to the carrier frequency of the sub-channel. In the case of a 4 kHz sub-channel, the base unit would analyze the band edges of only that 4 kHz sub-channel when locking to the mobile unit's carrier. By contrast, the base unit transmits across the entire frequency channel (e.g., a 25 kHz channel). As such, the mobile unit would analyze the band edges of the full channel signal.

The elements of FIGS. 3b through 3d are preferably embodied in instructions performed by a general purpose microprocessor, a special-purpose microprocessor, or digital signal processor. Alternatively, the elements may be embodied in custom logic running program instructions or in hardwired logic components configured to provide the same functionality. In one implementation of the present invention, certain elements of such as a oscillator 22 and I and Q filters 12 are implemented in hardware. One of ordinary skill in the art will recognize that the elements of FIGS. 1 through 3 represent either a hardware or software implementation of the invention and that the invention is not limited to either a hardware or a software implementation.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A circuit for acquiring the carrier signal of a modulated signal, the modulated signal having a right and a left band edge, comprising:

a first band pass filter centered about the right band edge;

a second band pass filter centered about the left band edge;

a comparator coupled to an output of said first band pass filter and to an output of said second band pass filter;

an error signal generator coupled to an output of said comparator;

a voltage controlled oscillator coupled to an output of said error signal generator;

wherein the voltage controlled oscillator outputs a clock signal and wherein an error signal generated by the error signal generator causes the voltage controlled oscillator to increase the clock signal frequency when the error signal is of a first polarity and to decrease the clock signal frequency when the error signal is of a second polarity; and a polarity detector, wherein the clock signal frequency is increased or decreased by a first predetermined frequency when the polarity detector indicates that the polarity of the error signal has not changed and is increased or decreased by a second pre-determined frequency when the polarity detector indicates that the polarity of the error signal has changed.

2. The circuit of claim 1 further comprising a counter indicating the number of times the polarity of the error signal has changed and wherein the clock signal frequency is increased or decreased by a third pre-determined frequency when the counter indicates the error signal polarity has changed more than a threshold number of times.

3. The circuit of claim 2 wherein the threshold number is three times.

4. The circuit of claim 2 wherein the first pre-determined frequency is 100 Hz, the second predetermined frequency is 60 Hz, and the third pre-determined frequency is 30 Hz.

* * * * *